United States Patent [19]

Ferrato

[11] 4,406,814
[45] Sep. 27, 1983

[54] LIQUID CRYSTALLINE MATERIALS AND OPTICAL DISPLAYS UTILIZING SAME

[75] Inventor: Joseph P. Ferrato, Silver Lake, Ohio

[73] Assignee: Eaton Corporation, Cleveland, Ohio

[21] Appl. No.: 252,733

[22] Filed: Apr. 10, 1981

[51] Int. Cl.³ .......................... C09K 3/34; G02F 1/13; C07C 121/60; C07C 121/46; C07C 69/757; C07C 69/75; C07C 69/017

[52] U.S. Cl. .............................. 252/299.1; 252/299.5; 252/299.62; 260/465 R; 260/465 D; 260/465 F; 260/464; 560/59; 560/61; 560/62; 560/64; 560/65; 560/73; 560/102; 560/106; 560/107; 560/108; 560/109; 560/116; 560/125; 560/1

[58] Field of Search ............ 252/299.1, 299.5, 299.62, 252/299.63, 299.64, 299.65, 299.67; 350/350 R; 260/465 R, 465 D, 464, 465 F; 560/64, 59, 61, 62, 73, 65, 102, 106, 107, 108, 109, 116, 125, 1

[56] References Cited

U.S. PATENT DOCUMENTS

| | | | |
|---|---|---|---|
| 4,009,934 | 3/1977 | Goodwin et al. | 252/299.64 |
| 4,029,594 | 6/1977 | Gavrilovic et al. | 252/299.65 |
| 4,073,742 | 2/1978 | Erdman et al. | 252/299.65 |
| 4,082,686 | 4/1978 | Tatsuta et al. | |
| 4,090,975 | 5/1978 | Aldrich et al. | |
| 4,110,243 | 8/1978 | Abert-Mellah et al. | 252/299.67 |
| 4,113,647 | 9/1978 | Coates et al. | 252/299.63 |
| 4,147,656 | 4/1979 | Aldrich et al. | 252/299.64 |
| 4,173,545 | 11/1979 | Beguin et al. | 252/299.64 |
| 4,202,791 | 5/1980 | Sato et al. | |
| 4,216,109 | 8/1980 | Mizukuchi. | |
| 4,222,887 | 9/1980 | Matsufuji | 252/299.64 |
| 4,228,030 | 10/1980 | Cole. | |
| 4,229,315 | 10/1980 | Krause et al. | 252/299.63 |
| 4,230,596 | 10/1980 | Beguin et al. | 252/299.64 |
| 4,235,736 | 11/1980 | Beguin et al. | 252/299.65 |
| 4,237,026 | 12/1980 | Eidenschink et al. | 252/299.63 |
| 4,290,905 | 9/1981 | Kambe | 252/299.63 |
| 4,293,434 | 10/1981 | Deutscher et al. | 252/299.63 |
| 4,341,652 | 7/1982 | Takei et al. | 252/299.66 |

FOREIGN PATENT DOCUMENTS

| | | | |
|---|---|---|---|
| 19665 | 12/1980 | European Pat. Off. | 252/299.63 |
| 2836086 | 3/1979 | Fed. Rep. of Germany | 252/299.64 |
| 2933563 | 2/1981 | Fed. Rep. of Germany | 252/299.63 |
| 2939782 | 4/1981 | Fed. Rep. of Germany | 252/299.64 |
| 105701 | 5/1974 | German Democratic Rep. | 252/299.63 |
| 56-43385 | 4/1981 | Japan | 252/299.67 |
| 2061311 | 5/1981 | United Kingdom | 252/299.67 |
| 2063287 | 6/1981 | United Kingdom | 252/299.63 |
| 2079275 | 1/1982 | United Kingdom | 252/299.63 |

OTHER PUBLICATIONS

SID Conference Paper–Presented at SID Conference in Boston during Apr. 1977, by R. Eidenschink et al.
Physics Letters–vol. 60A, No. 5, 21–Mar. 1977, by L. Pohl et al.
Chemical International Edition–vol. 16, No. 2, 1977.

*Primary Examiner*—Teddy S. Gron
*Attorney, Agent, or Firm*—C. H. Grace; A. E. Chrow

[57] ABSTRACT

Disclosed is a new family of Liquid Crystalline Materials for use in optical display devices having the general formula:

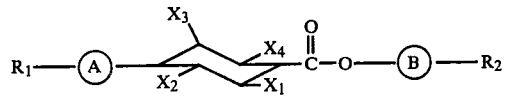

The members of the family of materials are characterized by having a broad nematic operating range in conjunction with low viscosity and exhibit fast response times to a controlled electrical field in the lower temperature regions of their nematic operating range and may be mixed with other members of the family or with other liquid crystalline materials and/or homologous non-liquid crystalline materials.

12 Claims, No Drawings

LIQUID CRYSTALLINE MATERIALS AND OPTICAL DISPLAYS UTILIZING SAME

INTRODUCTION

This invention relates generally to liquid crystalline materials suitable for use in optical display devices and more particularly to a family of nematic liquid crystalline materials incorporating at least one cyclohexane ring having one or more appended chemical groups and characterized by low viscosities, chemical stability and fast response times particularly at low temperatures to controlled electrical fields over a broad operating nematic temperature range when used as mixtures within the family or in mixtures with other liquid crystalline materials and/or homologous non-liquid crystalline compounds for use as an example in optical display devices.

BACKGROUND OF THE INVENTION

Although biphenyl based liquid crystal materials have been utilized for some time in optical displays due in part to relatively low operating power consumption, such materials generally have been unable to provide attractively low viscosities in conjunction with fast response times particularly at low temperatures to controlled electrical fields over a broad nematic operating temperature range.

Generally it has been the practice in the past to provide mixtures of two or more biphenyl based liquid crystalline materials to provide lower viscosity and a broader nematic operating temperature range than is ordinarily associated with just one of the biphenyl based liquid crystalline materials. In addition, lower viscosity and broader nematic operating temperature ranges particularly in lower temperature regions have been found to be characteristic where intermediate phenyl groups of liquid crystalline materials have been appended with methane or chlorine groups. Although such mixtures of biphenyl type liquid crystals or liquid crystals featuring methane or chlorine groups appended to a phenyl group may be used to advantage, they have been unable to achieve a fast response time to electrical fields at lower nematic operating temperatures and typically have been unable to achieve a response time of less than one minute at $-30°$ C.

An example of liquid crystalline materials having methane or chlorine groups appended to an intermediate phenyl group dependent upon the nature of phenyl groups chemically linked to the intermediate is proposed in U.S. Pat. No. 4,082,686. Although the liquid crystalline materials disclosed are proported to remain nematic over a wide temperature range, they are based upon Shiff Bases that are known to be unstable and generally exhibit a mesomorphic range higher than about $45°$ C. and do not exhibit a mesomorphic temperature lower than about $-20°$ C. even when mixed with other designated liquid crystalline materials and typically exhibit slow response times to an electrical field in the lower nematic operating temperature range.

An example of mixing certain nematic liquid crystalline materials in specific proportions in order to achieve a wide nematic operating temperature range is proposed in U.S. Pat. No. 4,090,975. Although the mixture may be used to advantage, the process requires the costly preparation and storage of chemically unstable Schiff's base nematic liquid crystalline compounds that are apt to deteriorate if not used within a short time after their preparation.

An example of the use of a cyclohexane ring in nematic liquid crystalline materials is proposed in U.S. Pat. No. 4,202,791. Disclosed is a typical alkylthioester type material in which one of the phenyl groups has been replaced with a 4 substituted cyclohexane derivative. Although the materials are proported to be useful singularly or in mixtures with at least one other nematic liquid crystalline and/or homologous non-liquid crystalline compounds they typically have been unable to possess fast response times to an electrical field at their lower nematic operating temperatures and more typically have been unable to exhibit a response time of less than one minute at $-30°$ C.

Another example of a biphenyl type liquid crystal having a chlorine atom appended to one of the phenyl groups as a means of broadening the nematic operating temperature range is proposed in U.S. Pat. No. 4,216,109. Although the materials disclosed are proported to have a nematic operating temperature range of about $33°$ C. to about $104°$ C., mixing equal moles of selected mixtures is reportedly able to broaden the range to include only from about $-5°$ C. to about $100°$ C., they generally exhibit slow response times at their lower nematic operating temperatures that are typically in the order of greater than one minute.

Another example of incorporating a cyclohexane ring in liquid crystal compositions is disclosed in U.S. Pat. No. 4,228,030. The requirement is imposed however to inventory, store and prepare a mixture comprising specific liquid crystalline materials incorporating a cyclohexane ring with a triphenyl composition that, although, chemically stable, exhibit a nematic operating temperature range of at most $0°$ C. to about at least $85°$ C. and have poor response times to an electrical field in the lower nematic temperature range typically in the order of 10 seconds or more at $-15°$ C.

An example of liquid crystalline materials incorporating disubstituted cyclohexane groups having either two cyclohexane groups or two phenyl groups or a phenyl and a cyclohexane group appended thereto is disclosed in U.S. Pat. No. 4,229,315. However, even by mixing variations of the prescribed materials in specific amounts, the nematic operating temperature range at best is still generally between about $-10°$ C. and about $85°$ C. with slow response times to an electrical field that are typically greater than one minute at their lower nematic operating temperatures.

SUMMARY OF THE INVENTION

Accordingly, it is an object of the invention to provide a family of novel liquid crystalline compounds characterized by being chemically stable and featuring low viscosities in conjunction with fast response times to controlled electrical fields over a broad nematic operating temperature range.

It is a further object of this invention to provide a family of novel liquid crystalline compounds that in mixtures within the family or in combination with other liquid crystalline compounds and/or homologous non-liquid crystalline compounds are able to provide low viscosity and fast response time to controlled electrical fields over a broad nematic operating temperature range and are particularly effective in the lower temperature regions of the range.

It is another object of this invention to provide a family of novel liquid crystalline compounds for use in optical display devices that are based upon substituted cyclohexane that in mixtures within the family or in combination with other liquid crystalline materials and/or homologous non-liquid crystalline compounds are able to provide low viscosities and fast response times to controlled electrical fields over a broad nematic operating temperature range and are particularly effective in the lower temperature regions of the range.

It is still a further object of this invention to provide an optical display device that utilizes a family of novel liquid crystalline compounds that are based upon substituted cyclohexane that in mixtures within the family or in combination with other liquid crystalline materials and/or homologous non-liquid crystalline compounds are able to provide low viscosities and fast response times to controlled electrical fields over a broad nematic operating temperature range and are particularly effective in lower temperature regions of the range.

DETAILED DESCRIPTION OF THE INVENTION

The above objects and others have been achieved by providing cyclohexane based nematic liquid crystalline materials of the formula:

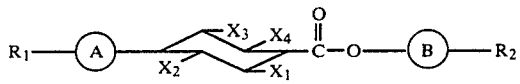

Wherein the groups appended to the cyclohexane ring are preferably equatorial with respect thereto and where:
$X_1$ is a methane or ethane group and $X_2$, $X_3$ and $X_4$ is a methane or ethane or chlorine or cyano or hydrogen group

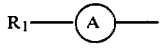

is a substituted phenyl of the formula

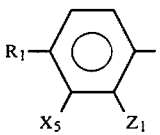

where $X_5$ and $Z_1$ is a hydrogen or methane or ethane or chlorine or cyano group,
or is a phenylbenzoate of the formula

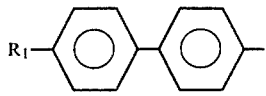

or is a disubstituted cyclohexyl-phenyl of the formula

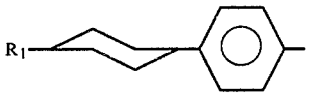

or is a bicyclo(2,2,2)octane ring of the formula

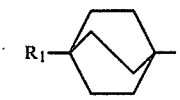

or is an ester of the formula

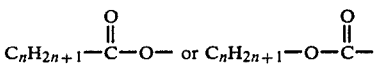

where n is an integer from 1 through 12
or is an alkyl group of the formula $-C_nH_{2n+1}$ where n is an integer from 1 through 12
or is an alkoxy group of the formula $C_nH_{2n+1}-O-$ where n is an integer from 1 through 12;
or is a cyano group,
where $R_1$ is a cyano group or an alkyl of the formula $-C_nH_{2n+1}$ or an alkoxy of the formula $C_nH_{2n+1}-O-$
is is an ester of the formula

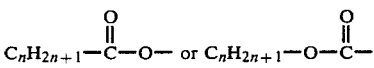

or a ketone of the formula

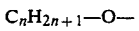

where n is an integer from 1 through 12;

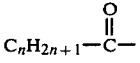

is a substituted phenyl of the formula

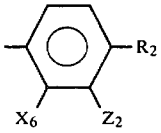

where $X_6$ and $Z_2$ is a hydrogen or methane or ethane or chlorine or cyano group
or is a substituted cyclohexane of the formula

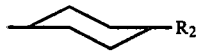

or is a bicyclo(2,2,2)octane ring of the formula

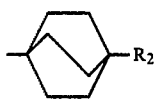

or is a phenylbenzoate of the formula

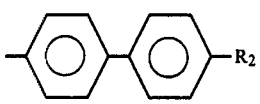

or is a substituted biphenyl of the formula

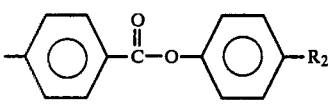

or is a pheynl-cyclohexane derivative of the formula

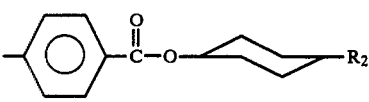

or is a alkyl of the formula $-C_nH_{2n+1}$ where n is an integer from 1 through 12.
where $R_2$ is a cyano group or an alkyl of the formula $-C_nH_{2n+1}$ or an alkoxy of the formula $C_nH_{2n+1}-O-$ or is an ester of the formula

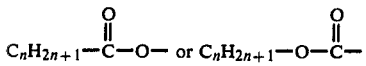

or a ketone of the formula

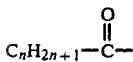

where n is an integer from 1 through 12.

The above materials, which include one or more chlorine or methane or ethane or cyano groups depended from the intermediate cyclohexane ring between the dependent

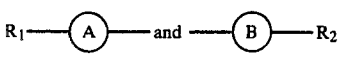

groups given above, provide a family of liquid crystalline materials that in mixtures within the family or in combinations with other liquid crystalline materials and/or homologous non-liquid crystalline materials are able to provide a family of liquid crystalline materials suitable for use in optical display devices characterized by low viscosity and exhibiting fast response time to controlled electrical fields over a broad nematic operating temperature range as well as exhibiting attractively fast response times at lower nematic operating temperatures.

DETAILED DESCRIPTION OF PREFERRED EMBODIMENTS

The preferably equitorial substituted intermediate cyclohexane component of the family of nematic liquid crystalline materials of the invention is for convenience referred to hereinafter as:

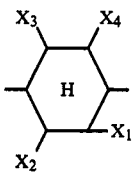

which in conjunction with the

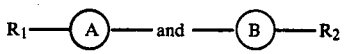

groups previously described, has been found to provide a new family of liquid crystalline materials suitable for use in optical display devices. Although the substituted cyclohexane component is preferably unsaturated, it may be partially saturated or saturated up to the extent permitted by the number of chemical groups appended thereto where such is desired. A preferred embodiment of the invention features a methane or ethane appended in the $X_1$ position and hydrogen appended in the $X_2$, $X_3$ and $X_4$ positions such that the material is a member of the family of liquid crystalline materials having the formula:

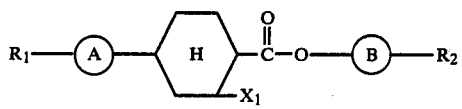

where $X_1$ is a methane or ethane group and

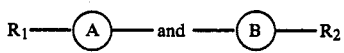

are selected from the groups previously described.

An example of particularly preferred embodiment is where $X_1$ is a methane and

are each as respectively shown below attached to the substituted cyclohexane component:

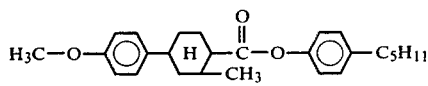

The above embodiment has been found to exhibit attractively low viscosity in conjunction with a fast response time to an electrical field at lower nematic operative temperatures when mixed with other liquid crystalline materials and or homologous non-liquid crystalline materials.

An example of one method by which particular members of the family of liquid crystalline materials of the invention can be made include starting with an intermediate compound of the formula:

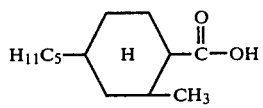

and chlorinating by adding phosphorous pentachloride in the presence of a suitable amount of heat to provide:

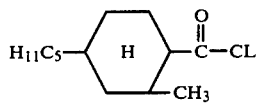

and then reacting with:

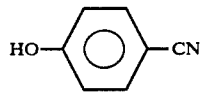

in the presence of triethylamine and methylene dichloride to provide:

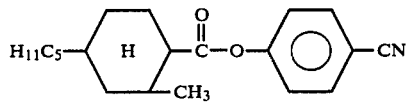

Another method of making a particular member of the family of liquid crystalline materials of the invention is by starting with an intermediate of the formula:

and chlorinating by adding phosphorus pentachloride in the presence of a suitable amount of heat to provide:

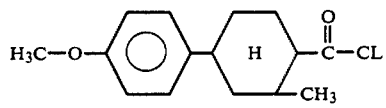

and then reacting with:

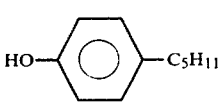

in the presence of triethylamine and methylene dichloride to provide:

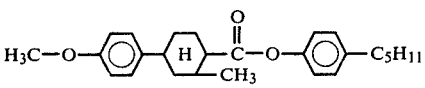

Starting intermediates such as illustrated in the above methods are chemically stable and capable of storage for long periods of time without deleterious effects as well as are the liquid crystalline materials of the invention derived therefrom.

In addition to providing a novel family of liquid crystalline materials when mixed amongst themselves within the family or when mixed with other liquid crystalline materials, the family of liquid crystalline materials of the invention are able to be used as a host with positive dichroic dyes such as anthraquinones in an amount preferably from 0.5% to about 10% by weight of the dye to the weight of the host to provide negative image optical displays. The members of the family of liquid crystalline materials are also useful as a host with dye having a negative optical axis such as where members of the family of liquid crystalline materials of the invention are mixed with tetrazine in an amount preferably from 1% to about 40% by weight of tetrazene to the weight of the host.

The family of liquid crystalline materials are also able to be synthesized so as to exhibit negative dielectric anistrophy such as for example where at least one of the $X_2$, $X_3$, or $X_4$ groups is a cyano group and/or when $Z_1$ and/or $Z_2$ are cyano groups. Members of the family of liquid crystalline materials of the invention exhibiting positive dielectric anistrophy may also be mixed with members of the family exhibiting negative dielectric anistrophy where such is desired. Members of the family of liquid crystalline materials are also able to exhibit electrical frequency dependency by having the capability of changing from a material having positive dielectric anistrophy to a material having negative dielectric anistrophy as a result of changing the frequency of the electrical field imposed across the materials.

Examples of other liquid crystalline materials particularly useful for mixing with one or more members of the family of liquid crystalline materials of the invention have the following formulas:

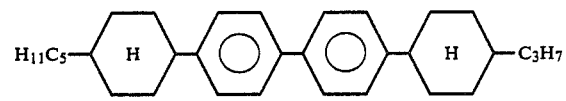

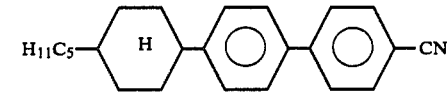

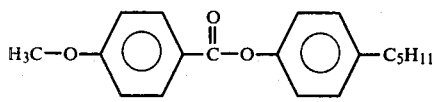

The liquid crystalline materials of the invention are able to be made from chemically stable intermediates such as previously described to provide a new family of liquid crystalline materials that when mixed amongst themselves and/or with other liquid crystalline materials and/or homologuous of non-liquid crystalline compounds provide attractively low viscosities in conjunction with fast response times to an electrical field over a broad nematic operating temperature range and particularly with respect to fast response times to an electrical field at lower nematic operating temperatures.

I claim:

1. A nematic liquid crystalline material having the formula

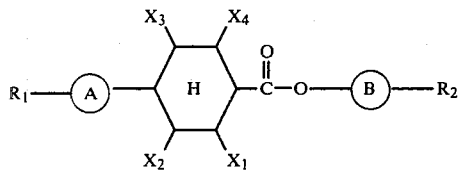

where: $X_1$ is a methane or ethane group; $X_2$, $X_3$, and $X_4$ are each selected from the group consisting of methane, ethane, chlorine, cyano, and hydrogen;

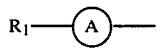

is a substituted phenyl of the formula $R_1$

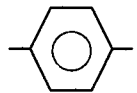

an alkyl group of the formula $-C_nH_{2n+1}$ where n is an integer from 1 through 12, or an alkoxy group of the formula $C_nH_{2n+1}-O-$ where n is an integer from 1 through 12 wherein $R_1$ is an alkyl group of the formula $-C_nH_{2n+1}$ or an alkoxy group of the formula $C_nH_{2n+1}-O-$ where n is an integer from 1 through 12;

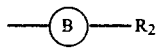

is a substituted phenyl of the formula

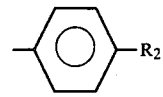

wherein $R_2$ is a cyano group of an alkyl group of the formula $-C_nH_{2n+1}$ or an alkxy group of the formula $C_nH_{2n+1}-O-$ where n is an integer from 1 through 12.

2. The liquid crystalline material of claim 1 having the formula:

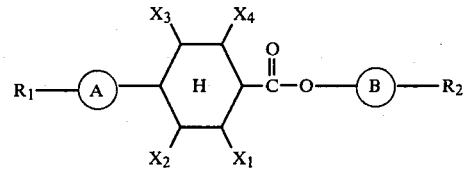

where $X_1$ is a methane or ethane group and $X_2$, $X_3$ and $X_4$ are hydrogen groups.

3. The liquid crystalline material of claim 1 or 2 wherein $X_1$ is a methane group and $X_2$, $X_3$ and $X_4$ are hydrogen groups.

4. The liquid crystalline material of claim 1 having the formula:

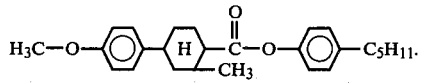

5. The liquid crystalline material of claim 1 wherein the material is used as a host in combination with a positive dichroic dye.

6. The liquid crystalline material of claim 5 wherein the combination provides a negative optical image.

7. The liquid crystalline material of claim 1 wherein the material is used as a host in combination with a dye having a negative optical axis.

8. The liquid crystalline material of claim 1 wherein the compound has a negative anisotropy provided by at least one of the $X_2$, $X_3$, and $X_4$ groups of the compound being a cyano group.

9. The liquid crystalline material of claim 8 mixed with a liquid crystalline material having positive dielectric anisotropy.

10. The liquid crystalline material of claim 1 wherein the material is characterized by changing from a material having positive dielectric anisotropy to a material having negative dielectric anisotropy in response to a change in the frequency of an electrical field imposed across the material.

11. The liquid crystalline material of claim 10 wherein at least one of the materials is characterized by changing from a material having positive electrical anisotropy to a material having negative electrical anisotropy in response to a change in the frequency of an electrical field imposed across the material.

12. An optical display device utilizing the liquid crystalline material of claim 1.

* * * * *

UNITED STATES PATENT OFFICE
CERTIFICATE OF CORRECTION

Page 1 of 3

Patent No. 4,406,814            Dated September 27, 1983

Inventor(s) Joseph P. Ferrato

It is certified that error appears in the above-identified patent and that said Letters Patent are hereby corrected as shown below:

Column 3, line 38, delete the words "methane" "ethane" and "is a" and substitute therefor --methyl--, --ethyl-- and --are--, respectively; line 39, delete the words "methane" "ethane" "chlorine" and substitute therefor --methyl--, --ethyl--, and --chloride--, respectively, and add the word --group-- after the word "cyano"; and line 40, delete the word "group" and substitute therefor --atom-- and insert a comma (--,--) thereafter; line 58, after the word "hydrogen" insert the word --atom--, delete the words "methane" and "ethane" and substitute therefor --methyl-- and --ethyl-- respectively; line 59, delete the word "chlorine" and substitute therefor --chloride--; line 60, delete the word "phenylbenzoate" and substitute therefor --biphenyl--; and after the formula on lines 62 through 66, insert a comma (--,--).

Column 4, after the formulas appearing on lines 6 and 12, insert a comma (--,--); line 22, after the number "12" insert a comma (--,--); line 26, after the number "12" insert a comma (--,--); line 33, after the number "12" delete the semicolon (";") and substitute therefor a comma (--,--); line 40, immediately after the formula insert a comma (--,--); line 49, delete the semicolon ";" and substitute therefor a period(--.--); line 66, after the word "hydrogen" insert the word --atom--; delete the words in lines 66 and 67 "methane", "ethane" and "chlorine" and substitute therefor --methyl--, --ethyl--, and --chloride--, respectively, and after the word "group" on line 67, insert a comma (--,--).

Column 5, immediately following the formulas on lines 3, 10, 18, 25, 33, and 43, insert a comma (--,--); line 13, delete the word "phenylbenzoate" and substitute therefor --biphenyl--; line 28, delete the word"phenyl-cyclohexane" and substitute therefor --cyclohexyl benzoate--; and line 53, delete the

UNITED STATES PATENT OFFICE
CERTIFICATE OF CORRECTION

Patent No. 4,406,814                    Dated  September 27, 1983

Inventor(s) Joseph P. Ferrato

It is certified that error appears in the above-identified patent and that said Letters Patent are hereby corrected as shown below:

words "chlorine", "methane" and "ethane" and substitute therefor --chloride--, --methyl--, and --ethyl--, respectively.

Column 6, line 10, and line 33, delete the word "cyclohexane" and substitute therefor --cyclohexyl--; line 37 and 49, delete the words "methane" and "ethane" and substitute therefor --methyl-- and --ethyl--, respectively; and line 59, delete the word "methane" and substitute therefor --methyl--.

Column 8, line 33, delete the word "tetrazene" and substitute therefor --tetrazine--; lines 37, 41, 43, 47 and 48, delete the word "anistrophy" and substitute therefor --anisotrophy--.

Column 9, line 32, delete the words "methane" and "ethane" and substitute therefor --methyl-- and --ethyl--; lines 33 and 34, delete the words "methane", "ethane" and "chlorine" and substitute therefor --methyl--, --ethyl-- and --chloride--, and after the word "hydrogen" in line 34, add the word --atom--; in the formula appearing on lines 42 through 48, delete the "$R_1$" immediately after the word "formula" and correct the formula to read and insert the word --or-- before "an alkyl" in line 49; and line 52, insert a semicolon after the number "12".

UNITED STATES PATENT OFFICE

CERTIFICATE OF CORRECTION

Patent No. 4,406,814  Dated September 27, 1983

Inventor(s) Joseph P. Ferrato

It is certified that error appears in the above-identified patent and that said Letters Patent are hereby corrected as shown below:

Column 10, line 7, delete "of", first occurrence, and substitute therefor --or--; line 8, delete the word "alkxy" and substitute therefor --alkoxy--; line 22, delete the words "methane" and "ethane" and substitute therefor --methyl-- and --ethyl--, respectively; line 23, delete the word "groups" and substitute therefor --atoms--.

Signed and Sealed this

Twenty-second Day of May 1984

[SEAL]

Attest:

GERALD J. MOSSINGHOFF

Attesting Officer  Commissioner of Patents and Trademarks